June 23, 1931.  S. B. BLAKELY  1,811,489

TRUNK RACK

Filed May 31, 1930  2 Sheets-Sheet 1

INVENTOR
SIDNEY B. BLAKELY
By  *Varel, Paul Hilow*
ATTORNEYS

June 23, 1931.  S. B. BLAKELY  1,811,489

TRUNK RACK

Filed May 31, 1930    2 Sheets-Sheet 2

INVENTOR
SIDNEY B. BLAKELY
By Paul, Paul & Moore
ATTORNEYS

Patented June 23, 1931

1,811,489

UNITED STATES PATENT OFFICE

SIDNEY B. BLAKELY, OF MINNEAPOLIS, MINNESOTA, ASSIGNOR TO DURKEE-ATWOOD COMPANY, OF MINNEAPOLIS, MINNESOTA, A CORPORATION OF MINNESOTA

TRUNK RACK

Application filed May 31, 1930. Serial No. 457,798.

This invention relates to an improved trunk rack adapted for use in connection with automobiles.

An object of the invention is to provide a trunk rack having means for securing it to the rear portion of the automobile, said means including an adjustably mounted bracket adapted to be positioned to fit a rear surface of the vehicle body.

A further object is to provide a trunk rack provided with means whereby it may be quickly fitted and secured to the bodies of various makes of automobiles.

A further object is to provide a combination trunk and tire rack provided with an adjustable attaching means, whereby it may readily be fitted to the rear portion of an automobile body, said rack also being adapted to provide a support for the usual bumper or "bumperettes", commonly provided at the rear of an automobile, and also having means for supporting a spare tire or wheel, and the usual license number plate.

Other objects of the invention will appear from the following description and accompanying drawings and will be pointed out in the annexed claims.

In the accompanying drawings, there has been disclosed a structure designed to carry out the various objects of the invention, but it is to be understood that the invention is not confined to the exact features shown as various changes may be made within the scope of the claims which follow.

Figure 1:
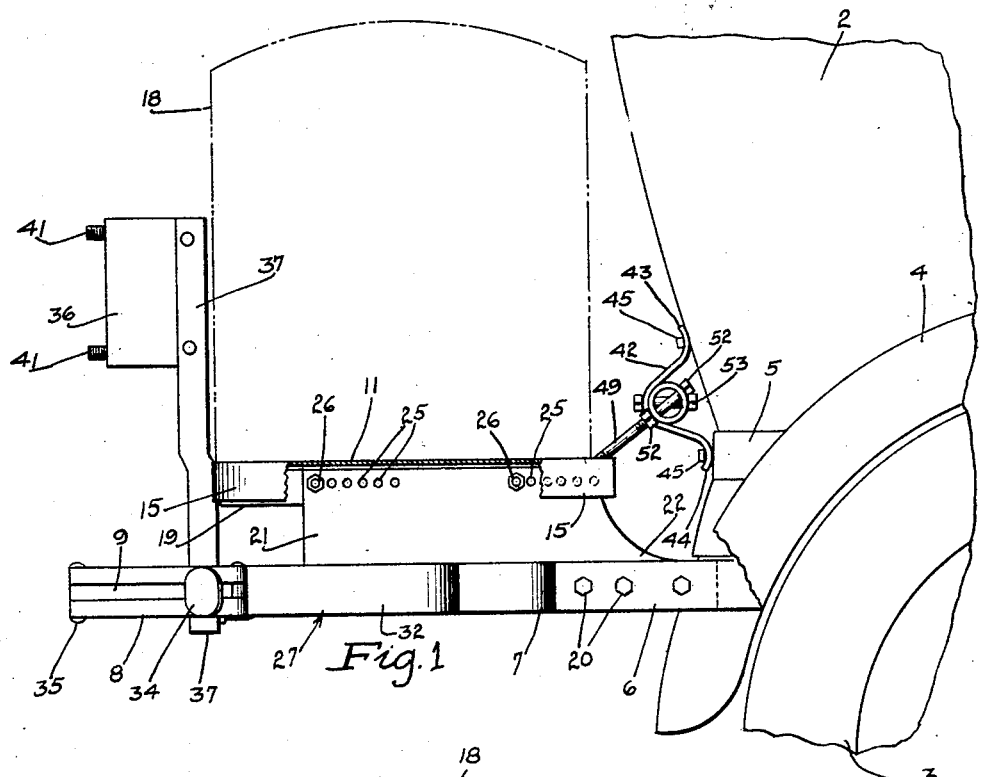
Figure 1 is a view showing the rear end portion of an automobile with my improved trunk rack attached thereto.
Figure 2:
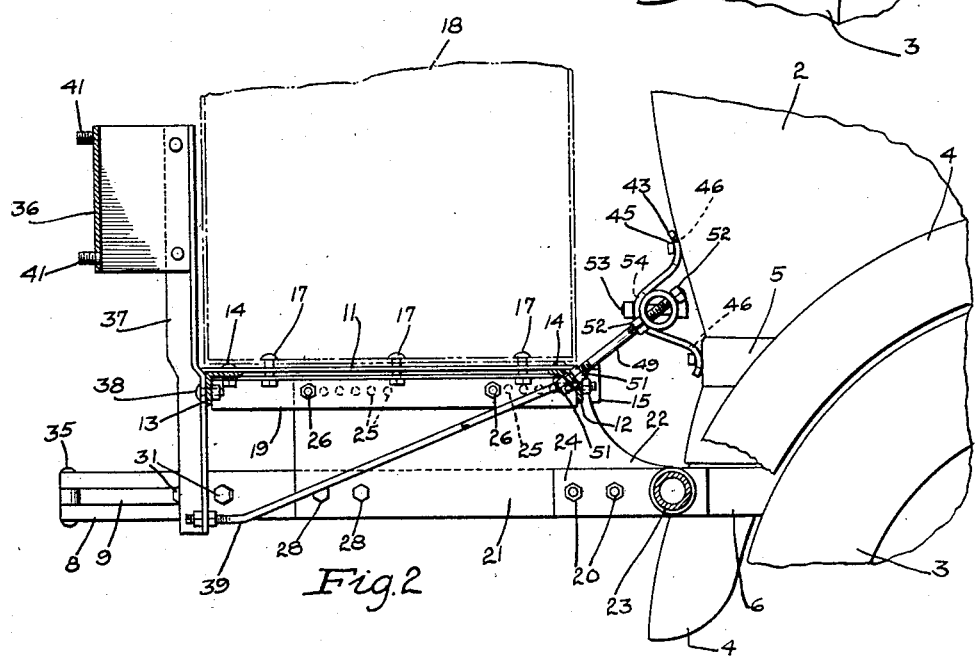
Figure 2 is a vertical sectional view on the line 2—2 of Figure 3.
Figure 3:
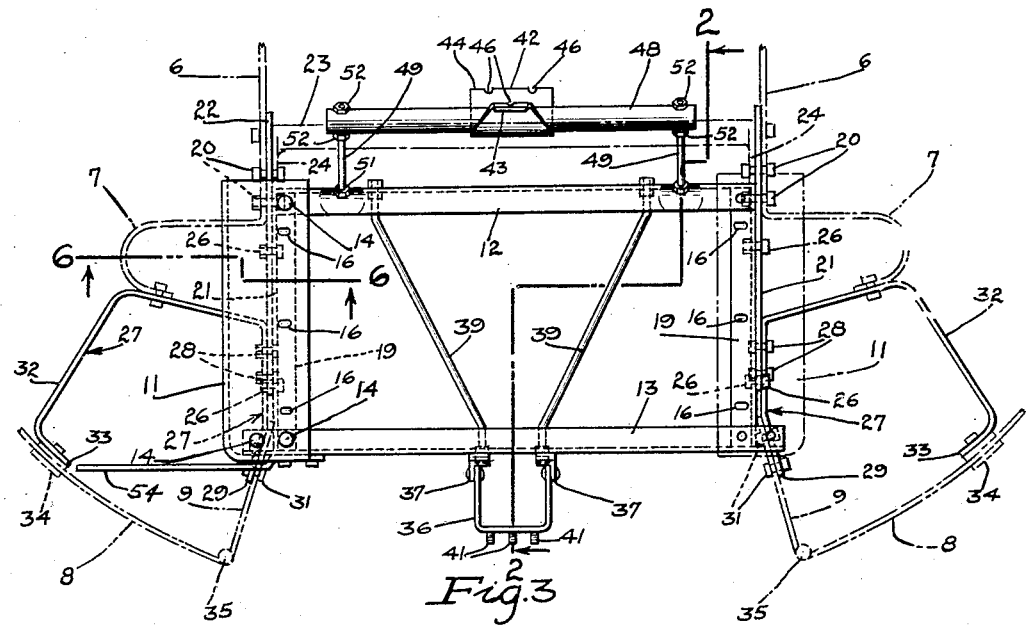
Figure 3 is a plan view showing the rack removed from the vehicle.

In the selected embodiment of the invention here shown, for purposes of disclosure, there is illustrated in Figures 1 and 2, the rear portion of an automobile including the body portion 2, wheel 3, fender 4, and chassis or body frame 5. Rearwardly extending members 6, indicated in dotted lines in Figure 3 and full lines in Figure 1, are suitably secured to the chassis and have their rear portions 7 bent outwardly and inwardly, as shown in Figure 3. These members are now commonly provided on various types of automobiles and provide means for supporting the usual bumper elements 8, indicated in dotted lines in Figure 3. Each bumper element has a strap member 9 for securing it to its support.

The novel trunk rack disclosed in this invention is shown comprising spaced-apart supporting plates 11 connected together at their forward and rearward portions by suitable cross members 12 and 13, respectively, preferably of angle iron cross section. Bolts 14 secure the cross members to the supporting plates 11. Each plate 11 is provided with a depending marginal flange 15, as best shown in Figure 6, and has slotted apertures 16 adapted to receive bolts 17 for securing a trunk 18 thereto, as best shown in Figure 2.

Figure 6:
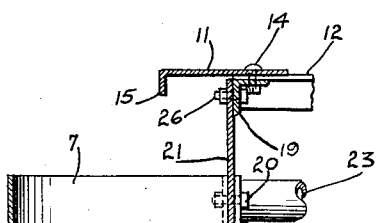
Figure 6 is a detail sectional view on the line 6—6 of Figure 3.

Longitudinally disposed angle irons 19 are shown secured to the end portions of the cross angles 12 and 13 beneath the supporting plates 11, as best shown in Figure 6. The angles 19 are secured to the cross angles 12 and 13 and plates 11 by means of the bolts 14 which pass through alined apertures provided in the above mentioned parts. The longitudinally disposed angle irons 19, the cross angles 12 and 13, and supporting plates 11 thus cooperate to provide a rectangular frame of rigid construction upon which the trunk may be supported.

Vertically disposed plates 21 have their forward portions 22 suitably secured to the rearwardly extending members 6 by suitable bolts 20, as shown in Figures 2 and 3. A tie bar 23, indicated in dotted lines in Figure 3 and full lines in Figure 2, is interposed between the plates 21. This tie bar is shown provided at each end with a lateral extension 24 adapted to be seated against the inner sides of the plates 21, and are apertured to receive the bolts 20, as will be clearly understood by reference to Figure 3. The vertically disposed plates 21 are provided adjacent their upper edges with a plurality of spaced apart apertures 25 adapted to receive bolts 26, as shown in Figure 1, and whereby the trunk-supporting frame may be adjustably secured thereto. The apertures 25 provide means whereby the trunk supporting frame may be adjusted in a direction lengthwise of the vehicle to properly position the trunk with respect to the rear body portion thereof (see Figure 1).

The usual bumper elements 8 are secured to the lower portions of the upright plates 21 by means of strap members 27 secured to the lower edges of the plates 21 by suitable bolts 28. The rear end portions 29 of the members 27 are slightly bent outwardly, whereby the strap members 9 of the bumper elements may be secured thereto by bolts 31, best shown in Figure 3. Each strap member 27 has a portion 32 bent outwardly and rearwardly and adapted to have its terminal 33 secured to its complemental bumper element 8, by means of a clamping device 34, shown in Figures 1 and 3. The bumper elements 8 are preferably pivotally connected to the strap members 9, as indicated at 35 in Figures 1, 2, and 3.

This novel trunk rack is also shown provided with means for supporting a spare wheel. A U-shaped member 36 has its spaced legs secured to suitable uprights 37, secured to the rear cross angles 13 by suitable bolts 38, as shown in Figure 2. The uprights 37 extend below the angle 13 and have brace rods 39 connecting them with the forward angle iron 12, whereby the uprights are firmly braced. Suitable studs 41 are provided in the U-shaped member 36 adapted to be engaged with the hub of the wheel, not shown.

Because of the overhanging nature of the trunk rack herein disclosed, means are provided to cooperate with the rearwardly extending members 6 to rigidly secure the rack to the vehicle, and whereby the rack may be attached to the vehicle body at a location considerably above the elevation of the members 6 to provide a substantial support for the rack.

Figure 5:
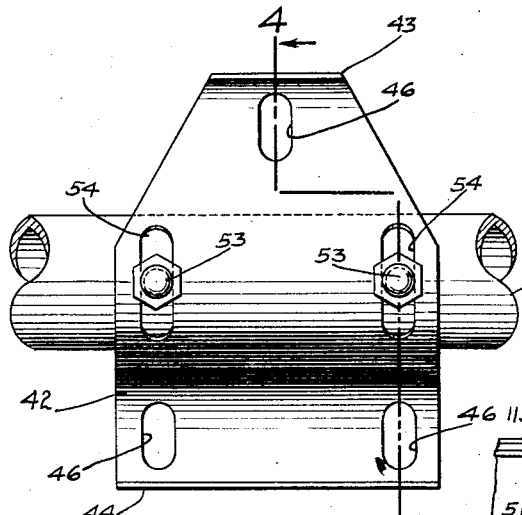
Figure 5 is a rear view of the adjustably mounted attaching bracket.
Figure 4:
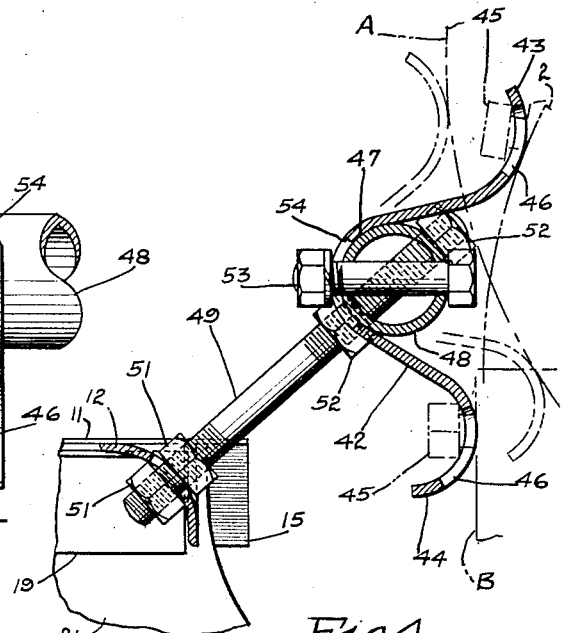
Figure 4 is an enlarged detail sectional view on the line 4—4 of Figure 5.

Such means is best shown in Figures 4 and 5, and consists of a bracket 42, shown formed from flat material, such, for example, as boiler plate, having its end portions 43 and 44 rolled or shaped as shown in Figure 4. These end portions are adapted to be seated against rear surfaces of the vehicle body and secured thereto by bolts 45, as shown in full lines in Figure 1, and indicated in dotted lines in Figure 4. The bolts 45 traverse elongated apertures 46 provided in the end portions 43 and 44, as shown in Figures 4 and 5. The intermediate portion of the bracket 42 is shaped to provide a concaved seat 47 adapted to receive a supporting member 48 having its end portions secured to the front cross angle 12 by means of threaded rods 49, provided with jamb nuts 51—51 and 52—52. The portions of the angle iron 12 which are apertured to receive the lower ends of the rods 49 are preferably shaped as shown in Figure 4, so that the jamb nuts 51 may seat against the opposite sides thereof. The upper ends of the rods 49 are received in apertures provided in the ends of the tubular member 48, and are secured thereto by the jamb nuts 52. The member 48 is adjustably secured to the bracket 42 by means of bolts 53 traversing elongated apertures or slots 54 provided in the intermediate portion 47 of the bracket 42, as clearly shown in Figures 4 and 5.

The connection between the supporting member 48 and the bracket 42 permits relative adjustment of the bracket with respect to the member 48 so that the bracket may be fitted against the vehicle body indicated by the full and dotted lines in Figure 4, to accommodate it to different shapes and forms of automobile bodies. The jamb nuts 51—51 and 52—52 also permit the member 48 to be adjusted relatively to the front cross angle 12 as will readily be understood by reference to Figure 4.

Because of the adjustable features of the bracket 42 and its adjustable connections with the cross angle 12 of the trunk rack frame, the rack may readily be installed upon various makes of vehicle bodies, even though they vary considerably in shape, as will readily be understood by reference to Figure 4, the curved lines A and B indicating the rear surfaces of vehicle bodies of different shapes. In some instances, it may be necessary to provide a suitable reinforcing member, not shown, within the vehicle body to receive the securing bolt 45. The spaced apertures 25 in the plate 21 also provide means whereby the trunk supporting plates 11 may be adjusted in a direction lengthwise of the vehicle to provide the necessary clearance between the upper forward portion of the trunk and the rear portion of the vehicle body, as indicated in Figure 1.

A laterally extending bracket 54 is shown provided at the rear left hand corner of the rack bar for supporting a license number plate (see Figure 3).

I claim as my invention:

1. A trunk rack including spaced-apart supporting plates having means for securing a trunk thereto, means for connecting said supporting plates with the frame of an automobile, a laterally disposed member adjustably connected with said plates and situated above and forwardly thereof, and a bracket adapted to partially encircle said member and having means for connecting it with the vehicle body, said bracket having an adjustable connection with said member.

2. A trunk rack comprising spaced-apart supporting plates connected together by suitable cross members, an upright plate adjustably connected with each supporting plate and each having an extension adapted to be secured to the frame of an automobile, a supporting member connected with one of said cross members, a bracket having a seat adapted to receive said supporting member, said bracket having spaced-apart portions adapted to be engaged with a rear portion of the vehicle body, and the connection between said bracket and said supporting member permitting the bracket to be relatively adjusted with respect to said member whereby the spaced-apart portions of said bracket may be positioned to engage the vehicle body regardless of its shape.

3. A trunk rack comprising spaced-apart supporting plates connected together by suitable cross members, an upright plate adjustably connected with each supporting plate and each having an extension adapted to be secured to the frame of an automobile, a cylindrical supporting member adjustably connected with one of said cross members, a bracket having a concaved seat adapted to receive said supporting member, said bracket having spaced apart portions adapted to be engaged with a rear portion of the vehicle body, and the connection between said bracket and said supporting member permitting the bracket to be relatively rotated upon said member whereby the spaced apart portions of said bracket may be positioned to engage a curved surface of the vehicle body.

4. A trunk rack comprising trunk-supporting plates connected together by suitable cross members, means for attaching said plates to a vehicle chassis, a supporting member secured to one of said cross members, and a plate bent to partially encircle said supporting member and provided with spaced apart legs adapted to be seated against a vehicle body and be secured thereto.

5. A trunk rack comprising trunk-supporting plates connected together by suitable cross members, means for attaching said plates to a vehicle chassis, a supporting member secured to one of said cross members, and situated above and forwardly thereof, and a plate bent to partially encircle said supporting member and provided with spaced-apart legs adapted to be seated against a vehicle body and be secured thereto, said bent plate having elongated apertures therein adapted to receive bolts and whereby it may be relatively rotated upon said supporting member to position it to fit the vehicle body.

In witness whereof, I have hereunto set my hand this 29th day of May, 1930.

SIDNEY B. BLAKELY.